H. K. FLAGLER.
Tube-Welding Mandrels.
No. 146,521.
Patented Jan. 20, 1874.
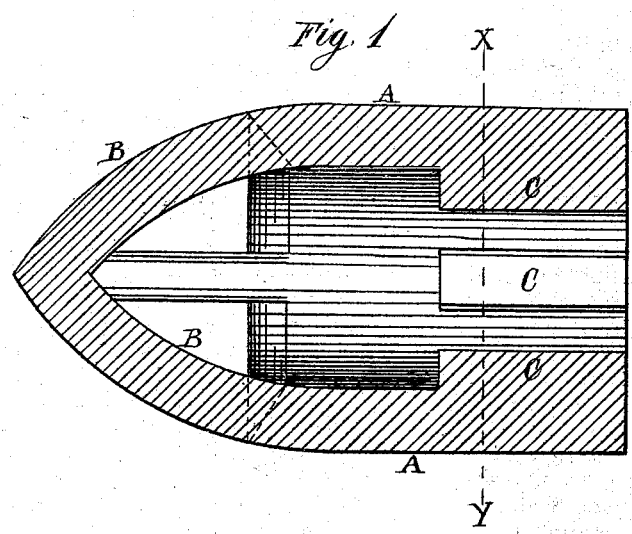
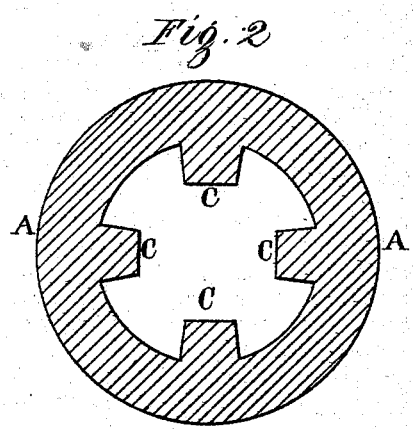
Witnesses
Sam¹ G. M. Barton
Chas. F. Pidgin
Inventor
Harry K. Flagler
by his atty.
Carroll D. Wright

UNITED STATES PATENT OFFICE.

HARVEY K. FLAGLER, OF BOSTON, MASSACHUSETTS, ASSIGNOR TO THE NATIONAL TUBE-WORKS COMPANY, OF SAME PLACE.

IMPROVEMENT IN TUBE-WELDING MANDRELS.

Specification forming part of Letters Patent No. 146,521, dated January 20, 1874; application filed October 6, 1873.

*To all whom it may concern:*

Be it known that I, HARVEY K. FLAGLER, of Boston, in the county of Suffolk and State of Massachusetts, have invented certain Improvements in Welding Balls or Mandrels for Tubing, of which the following is a specification:

Figure 1 of the accompanying drawing is a central vertical longitudinal section, and Fig. 2 is a vertical transverse section taken in line X Y, of my improved welding ball or mandrel.

The present invention relates to certain new and useful improvements in so-called "welding balls" or mandrels for welding tubing, pipes, &c., having for their principal objects the lessening of the weight of the metal and diminishing the cost of the ball, and the securing a firmer hold of the bar, so as to prevent its unsteadiness and wabbling when adjusted in the end of the welding ball or mandrel. My invention consists in a hollow welding ball or mandrel, formed at one end, on the interior, with longitudinal lugs or projecting pieces arranged on the top and bottom and on each side, to form a bearing for the bar, which is inserted in the aperture formed between their faces, the formation of said interior lugs or projections allowing the bar to be admitted farther into the ball and to be more securely held therein than is possible by the ordinary formation of a square opening in the end of the ball, as heretofore. Moreover, by the reduction of metal by the openings formed between the sides of the lugs or interior projections, the quantity of metal used in the construction of the ball is diminished, and its cost is thereby lessened.

In the drawing, A represents a welding ball or mandrel, cast hollow, and, in the present example, formed with a pointed open head, B, constructed as in a previous invention, for which Letters Patent of the United States, No. 142,622, were granted me the 9th day of September, 1873, with the exception that in the present case the exterior longitudinal grooves are omitted, and the outer periphery of the body and head of the ball are rounded to an even surface, instead of being broken by a shoulder or depression of the surface of the head at its junction with the body of the ball, as in the former invention; or the ball or mandrel may be of the usual form. At the end of the ball or mandrel, at the top and bottom and on each side of the interior periphery, are formed longitudinal lugs or projections C, rectilinear in shape, and extending inwardly the required distance, and forming between their faces a square opening of sufficient size to admit the insertion and the secure holding of a bar. The formation of the lugs C, as above described, allows the bar to have a more extended, and therefore a firmer, bearing within the ball or mandrel than is possible by the ordinary construction, on account of the increase of metal required in extending the bearing of the ordinary square opening to a sufficient depth to securely hold the bar, and the difficulty experienced in the management of the core of the ball should the bearing of the square opening be so extended. As heretofore constructed, the bearing of the square opening is not of sufficient depth to steadily hold the bar, and much annoyance and imperfect work are caused by its wabbling; whereas by my improvement not only is metal saved by the open spaces between the sides of the lugs or projections, but the latter may be formed of any length desired without interfering with the ready casting of the ball or mandrel, whose outer periphery may be more truly and evenly cast, owing to the steadiness of the bar, than by the ordinary arrangement.

Having thus fully described my improvements, what I claim as my invention, and desire to have secured to me by Letters Patent, is—

A welding ball or mandrel for tubing, having its end formed, on the interior, with lugs or longitudinal projections C, substantially as and for the purposes described.

In testimony whereof I have signed my name to this specification in the presence of two subscribing witnesses.

HARVEY K. FLAGLER.

Witnesses:
CARROLL D. WRIGHT,
SAML. M. BARTON.